Jan. 23, 1945.   M. BERKOW ET AL   2,367,750
AIRCRAFT CONSTRUCTION
Filed Jan. 17, 1941   2 Sheets-Sheet 1
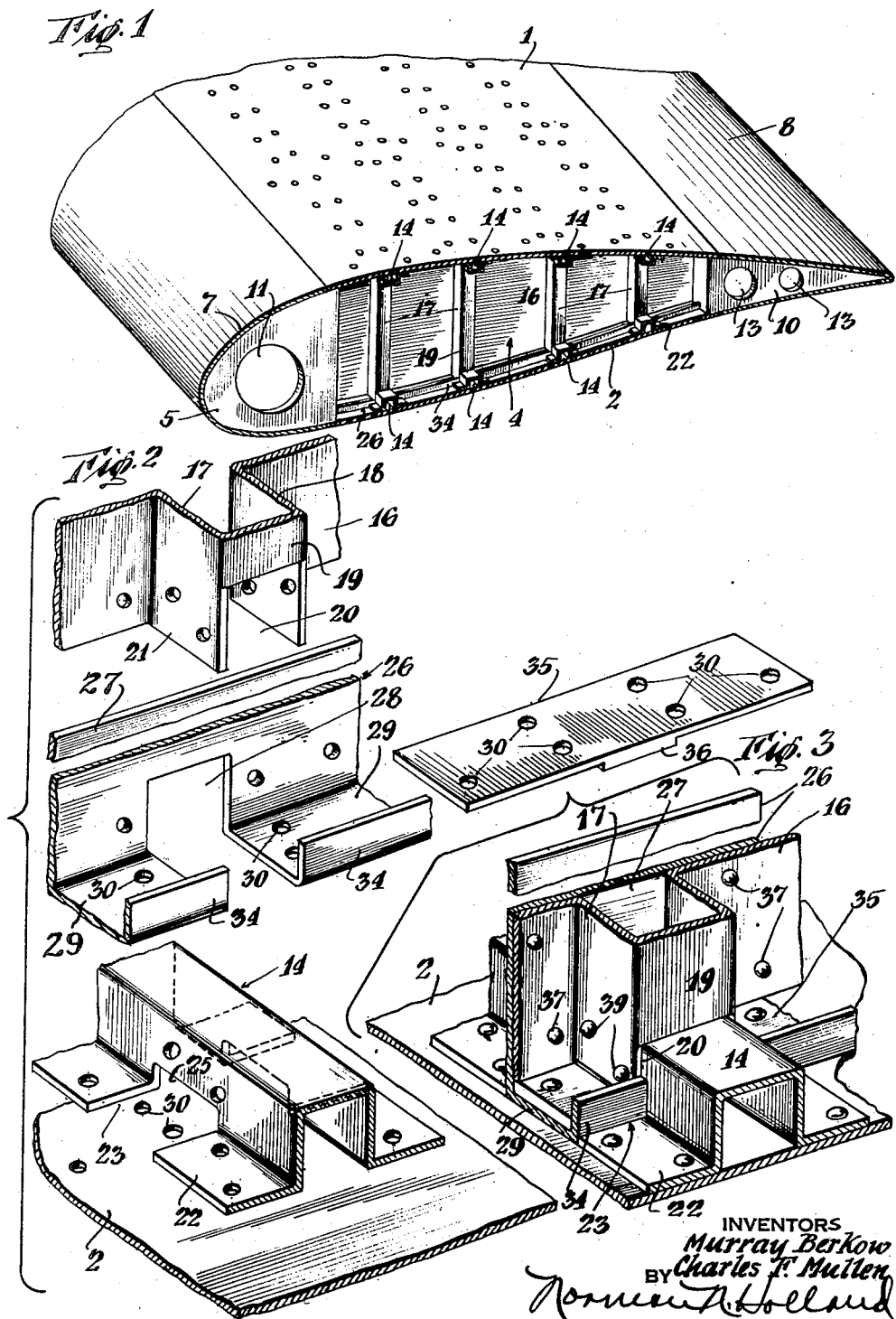
INVENTORS
Murray Berkow
Charles F. Mullen
BY
Norman T. Holland
ATTORNEY Jan. 23, 1945.  M. BERKOW ET AL  2,367,750
AIRCRAFT CONSTRUCTION
Filed Jan. 17, 1941   2 Sheets-Sheet 2

INVENTORS
Murray Berkow
BY Charles F. Mullen
ATTORNEY

Patented Jan. 23, 1945

2,367,750

UNITED STATES PATENT OFFICE 2,367,750

AIRCRAFT CONSTRUCTION

Murray Berkow, New York, N. Y., and Charles F. Mullen, Long Branch, N. J., assignors to Central Aircraft Corporation, Keyport, N. J., a corporation of Delaware Application January 17, 1941, Serial No. 374,810

13 Claims. (Cl. 244—123)

The present invention relates to aircraft and more particularly to a joint or truss structure adapted to be used in the construction of airplanes and the like.

A major consideration in the construction of aircraft is the elimination of all excess weight. Expensive light weight metals are customarily used and generally no expenses are spared in reducing the weight of aircraft consistent with the strength and safety required. Naturally if one joint or connection gives way additional strain is placed on other joints and members. Loss of life and a wrecked plane may result. One of the difficult problems confronting designers of aircraft is that of obtaining the necessary strength of trusses or joints without adding unduly to the weight of the parts. Numerous expedients have been attempted in endeavoring to obtain a joint having maximum strength with minimum weight, but many of them are either too complicated to utilize in commercial production or do not possess the requisite strength and lightness.

The present invention aims to minimize or overcome the above and other difficulties by providing a new and improved joint or truss construction that is relatively simple and inexpensive to manufacture and which possesses a high degree of strength combined with light weight. The invention further aims to provide a new and improved type of wing construction for airplanes.

An object of the present invention is to provide a new and improved type of joint or truss construction adapted to be utilized for aircraft.

Another object of the invention is to provide an improved joint or truss construction which is relatively simple and inexpensive to manufacture.

Another object of the invention is to provide a joint or truss construction which possesses great strength and light weight.

Another object of the invention is to provide a joint construction for aircraft which may be easily and rapidly assembled.

A further object of the invention is to provide a new and improved type of wing construction for airplanes.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a fragmentary sectional view of an airplane wing illustrating a preferred embodiment of the present invention;

Fig. 2 is a fragmentary exploded perspective view of one of the joints illustrated in Fig. 1;

Fig. 3 is a perspective view of the joint of Fig. 2 in assembled relation; and

Figure 4:
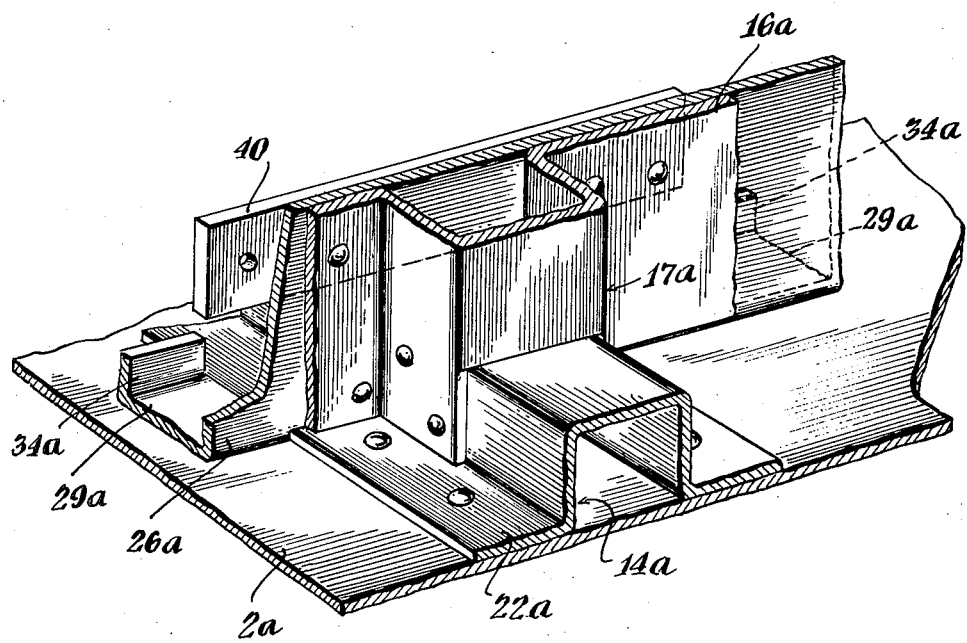
Fig. 4 is a fragmentary perspective view of a modified form of the invention.

The joint or truss construction of the present invention may be used at any desired location in an aircraft but for purposes of illustration and description it will be shown and described with reference to its association in an airplane wing or other airfoil. Also, the invention will be described with reference to aircraft manufactured largely from metal, but it will be understood that other material possessing similar qualities may be utilized.

Referring generally to the drawings, there is illustrated in Fig. 1 an airplane wing comprising upper and lower outer skin surfaces 1 and 2 retained in spaced relation by a main internal bracing truss structure 4. Nose forming members 5 attached to the front ends of the main center sections 4 in any convenient manner carry an outer skin covering 7 which forms the usual leading edge of the wing. The trailing edge 8 of the wing may be supported and braced by appropriately tapered members 10 which are secured in any convenient manner to the rear part of the main center section 4. The nose forming members 5 and trailing edge forming members 10 are preferably provided with holes 11 and 13 to decrease the weight thereof.

The main internal bracing or truss structure 4 which maintains the upper and lower outer surfaces 1 and 2 of a wing in correct positions comprises a plurality of channel members 14, sometimes referred to herein as stringer members, which extend longitudinally of the wing and have secured at substantially right angles thereto a bracing or retaining member such as the outwardly extending member 16, sometimes referred to herein as a web member. The outwardly extending member 16 is preferably stamped and formed from a single piece of sheet metal with the upper and lower contours thereof conforming substantially to the contours desired for the upper and lower airfoil skin surfaces 1 and 2. At spaced intervals, coinciding with the positions of the spaced longitudinally extending stringer members 14, the web members 16 are preferably provided with integral channel-shaped portions 17, which extend across the entire widths of the members 16. These channels 17 strengthen and increase the rigidity of the webs 16. Preferably the channels 17 are of a width sufficient to receive between them the longitudinal stringer members 14 and, to facilitate receiving the stringer members, the outer side 19 of each of the channels of the web members 6 is cut away to form recesses 20. The outwardly extending web members 16 are thus adapted to fit over the channel members 14 at the positions where the channels 17 are formed in the web members.

In Fig. 1 of the drawings, illustrating the preferred embodiment of the invention, the stringer members 14 which support the upper wing surface 1 are illustrated as positioned substantially directly above the stringer members 14 which support the lower wing surface 2. In this instance the strengthening channels 17 preferably extend substantially vertically between corresponding upper and lower stringer members 14. In instances where the upper and lower stringer members are not positioned directly above and below each other, the channels of the members 16 preferably extend, at any suitable angle, between a lower stringer and a corresponding upper stringer.

The construction and features whereby the web members 16 may be securely retained in position with respect to longitudinal stringer members 14 will now be described. The side flanges 22 of the stringer members 14, which facilitate securing the stringer members to an outer skin or other surface 2 of an aircraft, are provided with cut outs or recesses 23. The recesses 23 preferably extend from the side flanges 22 of a stringer member a short distance up the sides of the stringer member to form adjacent recesses 25. A holding member 26, sometimes referred to herein as a flange member, preferably substantially L-shaped in cross section, having apertures or slots 28 positioned at suitable intervals along the length thereof and of sufficient size to receive the upwardly projecting parts of stringer members 14 fits over the stringer members, with portions 29 at the sides of the slots 28 projecting into the recesses 23 at the flanges 22 of the stringer members 14. The base portion formed by the side portions 29 of the holding member or flange member 26 thus rests against the aircraft surface 2 in the stringer flange cut outs 23 (Fig. 3). A comparatively short outwardly extending lip 34 may be utilized at one side of the base portions 29 of the holding member 26 to increase the rigidity of the holding member and minimize the possibility of yielding when subjected to external forces. A substantially perpendicular side portion 27 at the other side of the base portions 29 of the holding member is adapted to lie alongside of and be secured to the web member 16. Preferably the holding members 26 have lengths substantially equal to those of the various web members 16 and are located at the upper and lower parts thereof.

Where a wing is to be manufactured the various rib members, which comprise web members 16 and holding members 26, are placed in desired positions. The stringers 14 then are placed or seated in the cooperating slots 20 and 23, respectively, of the web and holding members. In this position the leg portions 29, at the sides of the spaced slots 28 in the holding members 26, are seated in the recesses 23 of the stringer members 14. Plate members 35 may then be inserted through the recesses 25 in the legs of the stringers 14 so that they overlie the spaced base legs 29 of a holding member 26. The members 35 may be provided with central portions 36 of greater thickness than the end portions thereof; the thickened parts 36 are adapted to project into the spaces between the base legs 29 of the holding members 26. In this relation the undersurfaces of the flanges 22 of a stringer member 14, spaced base legs 29 of a holding member 26, and the thickened central portion 36 of plate members 35 form a substantially flush surface to which an outside skin or other aircraft surface may be attached. The plate members 35, base legs 29 of the holding or flange members 26, and the surface 2 of an aircraft may be secured together by rivets which pass through rivet holes 30 therein. If desired, these members may be secured together by welding or by other suitable means. In assembled relation the perpendicular side portion 27 of the holding member 26 extends upwardly closely alongside the rib member 16. Rivets 37 or welding may be used to secure the perpendicular part 27 of the flange member 26 to the web member 16. The sides 18 and 21 of the channel 17 which is formed in the web member 16 extend along the sides of the stringer member 14 and are preferably riveted, welded or otherwise secured directly thereto as at 39. Usually separate side clips or angle members are required to fasten the vertical sides 18 and 21 of the members 16 to a stringer 14; the present construction eliminates the need of separate side clips by fastening the vertical sides 18 and 21 directly to a stringer 14. In assembled relation (Fig. 3) the aircraft surface 2, stringer member 14, holding member 26, plate member 35, and web 16 are all securely held together and braced as a unitary structure against movement in any direction. Loads or stresses occurring in the legs 29 of the flange member or holding member 26 are carried across the gap or slot 28 by the plate member 35. The flush surface provided by the present joint construction is particularly advantageous for another reason: It is desired that modern high speed aircraft have smooth exposed skin surfaces, with practically no break in surface where two or more surface sheets are joined. With this joint construction two surface sheets may be positioned so that their edges lie in abutting relationship against the flush joint surface and then riveted to the flush surface of the joint through the base legs 29 of the flange member 26.

If desired, the plate member 35 and recesses 25 in the upwardly extending legs of the stringer members 14 may be omitted and the stringer member 14, flange or holding member 26, and member 16 secured together in a manner similar to that already described.

Fig. 4 illustrates a modified form of the present improved joint construction. The construction of the web members 16a and the fastening thereof to a stringer 14a, and of the latter to a surface 2a, may be similar to that described in connection with the preferred embodiment. The side flanges 22a of the stringer 14a are not cut out, but instead the flange or holding member 26a is cut out or recessed at the lower side thereof so that it fits over the stringer 14a. In this modified form of the invention it will be noted that the channels 17a of a web extend outwardly in one direction along a stringer and that the base portions 29a of a holding member 26a extend outwardly in a direction opposite to that of the stiffener web; if desired, the channels 11a and base portions 29a may extend or face in the same direction along a stringer, as illustrated in the preferred embodiment. A tie plate or reinforcing member 40, secured by riveting or the like to the holding members 26a and web member 16a, is preferably utilized to carry a flange member load across the cut out or recess therein.

The joint or truss construction is preferably utilized at each point where the several stringers 14, or other similar members, cross each of the members 16a, at both the top and bottom surfaces of the airfoil or wing. It is to be understood that features of the joint structure are applicable to the construction of any part of the aircraft, that is, in the construction of a fuselage, tail surfaces, control surfaces, et cetera; it has been described chiefly with reference to a wing in order to bring out the location in an airplane where its features are particularly advantageous.

It will be seen that the present invention provides a new and improved type of aircraft truss or joint construction which is simple to manufacture. The parts may be easily and rapidly assembled to form a joint or wing construction which possesses great strength combined with light weight and a minimum number of parts. The flange or holding member, with or without the tie plate, supplements the riveted connections between the sides of the channels in the web member and the stringer to form a joint having maximum strength with minimum weight. The tie plate may be used to add further to the strength of the joint. The strength and security of such a joint gives greater strength to the wing structure with the same weight of web and stringer members. If desired, the weight of the web and stringer members may be decreased with the present joint and, at the same time, maintain the equivalent strength of existing constructions. Further, the joint is rugged in construction and well able to stand any rough usage to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. In a wing construction for an airplane, the combination of a sheet metal surface, a channel-shaped stringer member having outwardly extending flanges secured to said sheet metal surface to cooperate in supporting the same, said channel member being cut away at portions of said flanges to form transverse passages adjacent the sheet metal surface, a web member extending transversely of and substantially perpendicular to said stringer member provided with a strengthening channel of slightly greater size than the channel of the stringer member, the top surface of the channel of the web member at the end of the web member being cut away to fit about the channel of the stringer member, and a holding member having a slot to accommodate the channel of the stringer member, said holding member having a part secured to said web member and a part at substantially right angles to the first part secured to the sheet metal surface.

2. In a wing construction for an airplane, the combination of a sheet metal surface, a channel-shaped stringer member having outwardly extending flanges secured to said sheet metal surface to cooperate in supporting the same, said channel member being cut away at portions of said flanges to form transverse passages adjacent the sheet metal surface, a web member extending transversely of and substantially perpendicular to said stringer member provided with a strengthening channel of slightly greater size than the channel of the stringer member, the top surface of the channel of the web member at the end of the web member being cut away to fit about the channel of the stringer member, a holding member having a slot to facilitate fitting about the channel of the stringer member, one leg of said L being secured to said web member and the other leg of the L-shaped member secured to the sheet metal surface and a tie plate extending over one leg of the L and through the cut away portions of said stringer member and secured to the surface member to retain the holding member in position.

3. In a wing construction for an airplane, the combination of a sheet metal surface, channel-shaped stringer members having outwardly extending flanges secured to said sheet metal surface to cooperate in supporting the same, a web member extending transversely of and substantially perpendicular to said stringer member provided with strengthening channels, and an L shaped holding member extending along said web member having slots, one in each leg of the L, to receive the channels of the stringer members, said holding member having one part of the L secured to said web member and another part of the L secured to the sheet metal surface.

4. In a wing construction for an airplane, the combination of upper and lower sheet metal surfaces, channel-shaped stringer members having outwardly extending flanges secured to said sheet metal surfaces to cooperate in supporting the same, web members extending transversely of and substantially perpendicular to said stringer members provided with strengthening channels, holding members extending along the upper and lower edges of said web members having slots to receive the channels of the stringer members, said holding members having parts secured to said web members and other parts at substantially right angles to the said first parts secured to the sheet metal surface.

5. A joint structure adapted to be used for aircraft comprising, in combination, a channel member for supporting the surface of an air foil, a holding member slotted to fit partially about the channel of said surface supporting channel member, and a channelled web member having the channel at one end slotted to receive the channel of said surface supporting channel member and secured to said supporting channel member and to said holding member.

6. A joint structure comprising, in combination, a channelled stringer member adapted to cooperate in supporting an air foil surface, said stringer member having flanges projecting outwardly from the channel and also having slots extending through said flanges and through portions of the sides of the channel, a holding member having a recess to receive the channel of said stringer member, a plate member extending through the slots in said stringer member to retain said holding member against upward movement, and an outwardly extending web member secured to said holding member.

7. A joint structure comprising, in combination, a channel member adapted to assist in supporting an aircraft surface, said channel member having a slot adjacent the lower part thereof, a holding member, a plate member extending over a portion of the holding member and through the slot in said first member to retain said holding member against upward movement, an outwardly extending member having an end recess adapted to receive the channel of the channel member, and means for securing said outwardly extending member to said holding member and to said channel member.

8. An air foil adapted to be used for aircraft comprising, in combination, a plurality of channelled stringer members adapted to support an air foil outer surface, an air foil outer surface secured to said stringer members, holding members fitting partially about the channels of certain of said stringer members and secured to said air foil outer surface, a web member having channels recessed at their ends to fit partially about the channels of the stringer members, and means for securing the ends of the web member to said holding members.

9. A wing for an aircraft comprising, in combination, an outer surface of sheet material, a plurality of channel members adapted to support said aircraft outer surface, the channels therein facing said outer surface and having slots adjacent said outer surface, holding members fitting partially about the channels of some of said channel members, plate members extending through the slots to fit over portions of the holding members to secure said holding members to the aircraft outer surface, an outwardly extending web member, and means for securing the ends of the web member to said holding member.

10. A wing for an aircraft comprising, in combination, stringer channel members for supporting an aircraft surface, an aircraft surface supported by said stringer channel members, holding members having flanges at their ends and slots through the flanges fitting over the channel portions of said stringer members, means for securing said flanges to said aircraft surface, outwardly extending web members, and means for securing the ends of said outwardly extending web members to said stringer members and to said holding members.

11. A wing for an aircraft, comprising, in combination, channel members for supporting an aircraft surface, an aircraft surface supported by said channel members, holding members having flanges at their sides and slots through the flanges fitting over the channel portions of the channel members, means for securing said holding members to said aircraft surface, outwardly extending members having a strengthening rib slotted at the ends of the outwardly extending web members to permit the sides thereof to rest against the sides of the channel portion of the channel members and means for attaching the ends of the outwardly extending members to said channel members and to said holding members.

12. A wing for an aircraft comprising, in combination, channel members for supporting an aircraft surface, an aircraft surface supported by said channel members, flanged holding members having flanges at their ends and slots through the flanges fitting over the channel portions of said channel members, means for securing said channel members to said aircraft surface, and outwardly extending web members having a channel formed therein recessed at the ends thereof to fit over the channel portions of said channel members with portions of the channel in the web member secured to the channel members and with other portions of the outwardly extending web member secured to said holding member.

13. A joint structure comprising, in combination, a channelled member adapted to cooperate in supporting an aircraft surface, said channelled member having a slot adjacent the lower part thereof, a holding member having a slot fitting partially about said channelled member, said holding member projecting into the slot of the channel member, a plate member extending through the slot of said channelled member to retain said holding member, said plate member having a portion of increased thickness fitting into the slot of said holding member and an outwardly extending web member recessed at one end to extend partially about said channelled member and secured to said holding member.

MURRAY BERKOW.
CHARLES F. MULLEN.